(12) United States Patent
Nozaki (10) Patent No.: US 6,757,603 B2
(45) Date of Patent: Jun. 29, 2004

(54) SLIPPAGE PREVENTION APPARATUS OF BELT-DRIVE CONTINUOUSLY VARIABLE TRANSMISSION FOR AUTOMOTIVE VEHICLE

(75) Inventor: Mikio Nozaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/337,899

(22) Filed: Jan. 8, 2003

(65) Prior Publication Data

US 2004/0023755 A1 Feb. 5, 2004

(30) Foreign Application Priority Data

Jan. 22, 2002 (JP) ........................................ 2002-012642

(51) Int. Cl.$^7$ ................................................. G06F 7/00
(52) U.S. Cl. ............................ 701/51; 701/71; 701/79; 474/8; 477/37; 477/44; 477/50
(58) Field of Search ............................ 701/51, 52, 70, 701/71, 79, 82, 95; 474/8, 101; 477/37, 38, 44, 50, 64

(56) References Cited

U.S. PATENT DOCUMENTS 4,731,044 A * 3/1988 Mott ............................ 474/8
5,259,272 A * 11/1993 Yamamoto et al. ........... 477/45
5,853,347 A   12/1998 Aoki et al.

FOREIGN PATENT DOCUMENTS

JP      8-258595 A    10/1996
JP      9-53695 A     2/1997

* cited by examiner

Primary Examiner—Gertrude A. Jeanglaude
(74) Attorney, Agent, or Firm—Foley & Lardner LLP (57) ABSTRACT

In a slippage prevention apparatus of a belt-drive continuously variable transmission for an automotive vehicle in which a transmission ratio is controlled by a speed-change hydraulic pressure brought closer to a desired speed-change hydraulic pressure, a quick-acceleration-frequency decision section is provided to determine whether a frequency of quick accelerating operations is low or high. Also provided is a desired hydraulic pressure decision section that sets the desired speed-change hydraulic pressure used during an operating mode that the frequency of quick accelerating operations is low to a relatively lower pressure level than the desired speed-change hydraulic pressure used during an operating mode that the frequency of quick accelerating operations is high.

20 Claims, 7 Drawing Sheets

SLIPPAGE PREVENTION APPARATUS OF BELT-DRIVE CONTINUOUSLY VARIABLE TRANSMISSION FOR AUTOMOTIVE VEHICLE

TECHNICAL FIELD

The present invention relates to a slippage prevention apparatus of a belt-drive continuously variable transmission for an automotive vehicle, and specifically to the improvement of techniques for optimizing a so-called speed-change hydraulic pressure to prevent slippage between a variable-width pulley and a drive belt incorporated in a belt-drive continuously variable transmission (CVT) through all engine operating conditions.

BACKGROUND ART

In recent years, there have been proposed and developed various belt-drive continuously variable transmissions (CVTs), which enable an actual transmission ratio to be steplessly adjusted or feedback-controlled toward a desired transmission ratio. As is generally known, in case of a lack of the speed-change hydraulic pressure with respect to the magnitude of input torque transferred to the input shaft of a belt-drive continuously variable transmission, there is an increased tendency for undesired slippage (frictional losses or power losses) between a variable-width pulley and a drive belt to occur. This causes drive-belt wear, thereby reducing the durability of the drive belt. On the contrary, excessively building up the speed-change hydraulic pressure with respect to the magnitude of input torque transferred to the CVT, causes a wasteful increase in the load on an engine-driven oil pump. For the reasons discussed above, it is desirable to keep the speed-change hydraulic pressure to just below a critical pressure level where a slippage between the variable-width pulley and the drive belt would start to develop. Actually, it is difficult to hold the speed-change hydraulic pressure to just below the critical pressure level for slippage prevention, because of various factors, that is, differences in quality of hydraulic parts used in a hydraulic modulator of the CVT, drive-belt wear, input-torque fluctuations, disturbance torque, a delay in response of the speed-change hydraulic pressure to a rapid change in input torque, and the like. To effectively prevent undesirable slippage irrespective of the presence or absence of the previously-noted factors, Japanese Patent Provisional Publication No. 9-53695 (hereinafter is referred to as "JP9-53695", corresponding to U.S. Pat. No. 5,853,347, issued to Takashi Aoki et al. on Dec. 29, 1998) teaches the increase in a margin of the speed-change hydraulic pressure. On the other hand, Japanese Patent Provisional Publication No. 8-258595 (hereinafter is referred to as "JP8-258595") teaches the limitation or suppression of a time rate of change in input torque transferred to the CVT to avoid a rapid change in the CVT input torque, occurring due to a sudden driver's accelerator pedal depression.

SUMMARY OF THE INVENTION

In the CVT disclosed in JP9-53695, the margin of the speed-change hydraulic pressure is constantly set or maintained at a high level, and thus the load on the engine-driven oil pump tends to increase. This deteriorates fuel economy and lowers the vehicle driveability. On the other hand, in the control apparatus for the CVT and internal combustion engine, disclosed in JP8-258595, when the accelerator pedal is greatly quickly depressed owing to the driver's wishes (i.e., quick accelerating operation), it is impossible to timely precisely increase the CVT input torque responsively to the rapid accelerator pedal's depression, because of the limitation or suppression of the time rate of change in CVT input torque. As a result, it is impossible to provide a better response to a quick acceleration (a sudden depression of the accelerator pedal). This lowers the acceleration performance of the vehicle. The inventor of the present invention directs attention to the fact that slippage of the belt-drive CVT becomes an issue in particular when quickly accelerating the vehicle.

Accordingly, it is an object of the invention to provide a slippage prevention device of a belt-drive continuously variable transmission for an automotive vehicle, which avoids the aforementioned disadvantages.

It is another object of the invention to provide a slippage prevention apparatus of a belt-drive continuously variable transmission for an automotive vehicle, which is capable of improving fuel economy, and enhancing the vehicle driveability, and acceleration performance by optimizing a so-called speed-change hydraulic pressure depending on a frequency of quick accelerating operations.

In order to accomplish the aforementioned and other objects of the present invention, a slippage prevention apparatus of a belt-drive continuously variable transmission for an automotive vehicle whose transmission ratio is controlled by a speed-change hydraulic pressure brought closer to a desired speed-change hydraulic pressure, comprises a quick-acceleration-frequency decision section that determines whether a frequency of quick accelerating operations is low or high, and a desired hydraulic pressure decision section that sets the desired speed-change hydraulic pressure used during an operating mode that the frequency of quick accelerating operations is low to a relatively lower pressure level than the desired speed-change hydraulic pressure used during an operating mode that the frequency of quick accelerating operations is high.

According to another aspect of the invention, a slippage prevention apparatus of a belt-drive continuously variable transmission for an automotive vehicle whose transmission ratio is controlled by a speed-change hydraulic pressure brought closer to a desired speed-change hydraulic pressure, comprises a quick-acceleration-frequency decision means for determining whether a frequency of quick accelerating operations is low or high, and a desired hydraulic pressure decision means for setting the desired speed-change hydraulic pressure used during an operating mode that the frequency of quick accelerating operations is low to a relatively lower pressure level than the desired speed-change hydraulic pressure used during an operating mode that the frequency of quick accelerating operations is high.

According to a further aspect of the invention, a method of preventing slippage between a variable-width pulley and a drive belt of a belt-drive continuously variable transmission for an automotive vehicle whose transmission ratio is controlled by a speed-change hydraulic pressure brought closer to a desired speed-change hydraulic pressure, the method comprises determining whether a frequency of quick accelerating operations is low or high, setting a low-pressure enabling flag during an operating mode that the frequency of quick accelerating operations is low, resetting the low-pressure enabling flag during an operating mode that the frequency of quick accelerating operations is high, and setting the desired speed-change hydraulic pressure used during the operating mode that the low-pressure enabling flag is set to a relatively lower pressure level than the desired speed-change hydraulic pressure used during the operating mode that the low-pressure enabling flag is reset.

The other objects and features of this invention will become understood from the following description with reference to the accompanying drawings.

DESCRIPTION OF THE PREFERRED EMBODIMENTS

Figure 1:
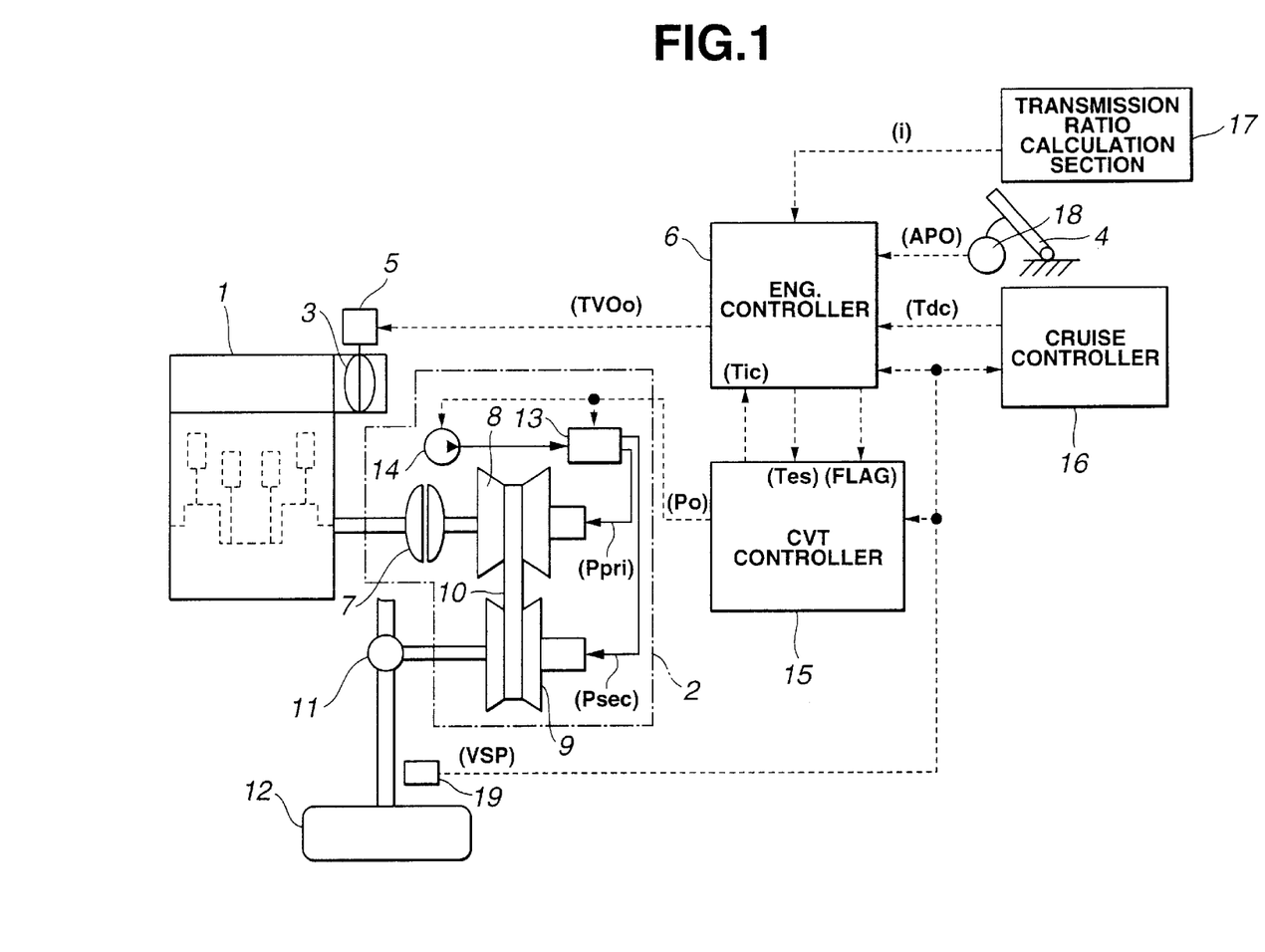
FIG. 1 is a system block diagram of a first embodiment illustrating a power train and an integrated control system of an automotive vehicle employing a slippage prevention apparatus of a belt-drive CVT.

Referring now to the drawings, particularly to FIG. 1, a belt-drive continuously variable transmission 2 is used as a main power-train component of the power train that carries the power from an internal combustion engine 1 to left and right drive wheels 12. Engine 1 uses an electronically-controlled throttle unit comprised of a throttle valve 3 and an electrically-operated throttle actuator 5. That is, throttle valve 3 is not linked to an accelerator pedal 4 that is operated or depressed by the driver. A throttle opening TVO of throttle valve 3 is electronically adjusted or controlled by means of throttle actuator 5 as fully described later. Throttle actuator 5 usually comprises a stepper motor, also known as a "stepping motor" or a "step-servo motor". Throttle actuator 5 of the electronically-controlled throttle is connected via a signal line to the output interface (or a drive circuit) of engine controller 6, so that the angular steps or essentially uniform angular movements of the stepper motor can be obtained electromagnetically depending on a control signal (or a drive signal) from the output interface of engine controller 6 and indicative of desired throttle opening $TVO_0$. As discussed above, throttle actuator 5 is feedback-controlled responsively to the control signal (corresponding to desired throttle opening $TVO_0$) from engine controller 6, so that the actual throttle opening TVO is brought closer to desired throttle opening $TVO_0$. Engine power output (the throttle opening of the electronically-controlled throttle) is basically controlled depending on an accelerator-pedal depression amount APO. As will be hereinafter described in detail in reference to the flow chart shown in FIG. 3, the engine power output (the throttle opening) can be controlled based on the other factors except accelerator-pedal depression amount APO.

Belt-drive continuously variable transmission 2, often abbreviated to "belt-drive CVT" is comprised of a primary pulley 8, a secondary pulley 9, and a V belt (exactly, a segmented steel belt) 10 wound on the primary and secondary pulleys. Primary pulley (driving pulley) 8 is connected via a torque converter 7 to the output shaft (i.e., engine crankshaft) of engine 1. The V-groove of secondary pulley (driven pulley) 9 is aligned with the V-groove of primary pulley 8. Secondary pulley 9 is connected via a final drive gear set 11 containing a differential gear to left and right drive road wheels 12. To run the vehicle, the power output from engine 1 is transmitted through belt-drive CVT 2 and final drive gear set 11 to the left and right drive wheels. In order to steplessly vary a transmission ratio (a pulley ratio) i of belt-drive CVT 2, the adjustable or movable flanges of primary and secondary pulleys 8 and 9 are designed to slide axially on linear ball bearing splines (not shown), relative to the fixed flanges and to prevent relative rotation of the adjustable flanges to the respective fixed flanges. Actually, the axial position of the adjustable flange of primary pulley 8 is controlled by a primary pulley actuation pressure (simply, a primary pulley pressure) $P_{pri}$ produced by means of a hydraulic actuator or a hydraulic modulator (a speed-change control hydraulic circuit) 13, while the axial position of the adjustable flange of secondary pulley 7 is controlled by a secondary pulley actuation pressure (simply, a secondary pulley pressure) $P_{sec}$ produced by means of speed-change control hydraulic circuit 13. As a result, it is possible to steplessly vary a pulley ratio (a transmission ratio) between the primary and secondary pulleys within limits, so that the pulley ratio is brought closer to the desired pulley ratio. Speed-change control hydraulic circuit 13 produces a so-called speed-change hydraulic pressure from pressurized working fluid from an engine-drive oil pump 14, such that the speed-change hydraulic pressure is brought closer to a pressure level equivalent to a desired speed-change hydraulic pressure $P_0$ that is output from the output interface of a CVT controller 15 (described later). The speed-change hydraulic pressure produced by speed-change control hydraulic circuit 13 is fed into secondary pulley 9 as a secondary pulley pressure $P_{sec}$. Although it is not clearly shown in FIG. 1, a speed-change control valve is disposed in speed-change control hydraulic circuit 13. The speed-change control valve is responsive to a pulley-ratio command or a transmission-ratio command from CVT controller 15 to produce a primary pulley pressure $P_{pri}$ corresponding to the pulley-ratio command, utilizing the speed-change hydraulic pressure equivalent to desired speed-change hydraulic pressure value $P_0$ as an initial pressure. As can be seen in FIG. 1, primary pulley pressure $P_{pri}$ is applied to the adjustable flange of primary pulley 8 so that the adjustable flange moves toward the fixed flange, whereas secondary pulley pressure $P_{sec}$ is applied to the adjustable flange of secondary pulley 9 so that the adjustable flange moves toward the fixed flange. Although it is not clearly shown in FIG. 1 for the purpose of illustrative simplicity, in a conventional manner, the axial position of the primary-pulley adjustable flange is controlled by primary pulley pressure $P_{pri}$ in a primary pulley actuation cylinder of a driving-pulley hydraulic actuator. On the other hand, the axial position of the secondary-pulley adjustable flange is controlled by way of the spring bias plus secondary pulley pressure $P_{sec}$ in a relatively smaller-diameter secondary pulley actuation cylinder of a driven-pulley hydraulic actuator. Usually, a pressure-receiving area of the primary-pulley adjustable flange receiving primary pulley pressure $P_{pri}$ is designed to be two-times greater than that of the secondary-pulley adjustable flange receiving secondary pulley pressure $P_{sec}$. With the previously-noted arrangement, the effective diameters of primary and secondary pulleys 8 and 9 are continuously changeable in response to the differential pressure between secondary pulley pressure $P_{sec}$ and primary pulley pressure $P_{pri}$. Thus, the speed-change ratio or the transmission ratio (pulley ratio) of belt-drive CVT 2 can be continuously varied within certain limits, depending on the differential pressure. Actually, both of the primary-pulley adjustable flange and the secondary-pulley adjustable flange can shift depending on primary pulley pressure $P_{pri}$ and secondary pulley pressure $P_{sec}$ output from speed-change control hydraulic circuit 13 whose output pressures ($P_{pri}$, $P_{sec}$) are modulated in response to the control command signal reflecting the desired transmission ratio. This enables the actual transmission ratio of belt-drive CVT 2 to be steplessly adjusted or feedback-controlled toward the desired transmission ratio. As shown in FIG. 1, the control command corresponding to desired speed-change hydraulic pressure $P_0$ is also output from CVT controller 15 to oil pump 14 so as to obtain minimum possible flow rate (to be fed from oil pump 14 into both primary and secondary pulleys 8 and 9) needed to attain desired speed-change hydraulic pressure $P_0$ computed by the processor of CVT controller 15. By way of such flow-rate control based on desired speed-change hydraulic pressure $P_0$, it is possible to effectively reduce the load on oil pump 14. In order to timely precisely calculate or estimate desired throttle opening $TVO_0$ within engine controller 6 and to timely precisely calculate or estimate desired speed-change hydraulic pressure $P_0$ within CVT controller 15, engine controller 6, CVT controller 15, and a cruise controller 16 (described later) are intercommunicated with each other, for information exchange of various informational data, such as a limit torque Tic (described later) of torque input into belt-drive CVT 2, an engine torque command value Tes (described later), a low-pressure enabling flag FLAG (described later), and a constant-speed running mode desired driving force Tdc. As can be seen from the system block diagram of FIG. 1, the input interface of engine controller 6 receives the other input information such as a transmission ratio i (=Ni/No) of belt-drive CVT 2 (that is, a ratio of a transmission input-shaft rotational speed Ni to a transmission output-shaft rotational speed No), an accelerator-pedal depression amount indicative signal APO from an accelerator position sensor 18, and a vehicle-speed indicative signal VSP from a vehicle speed sensor 19, in addition to the previously-noted signals Tic and Tdc. Vehicle-speed indicative signal VSP from vehicle speed sensor 19 is also output to both CVT controller 15 and cruise controller 16. Transmission ratio i (=Ni/No) of belt-drive CVT 2 is calculated by means of a transmission ratio arithmetic-calculation section 17.

Figure 2:
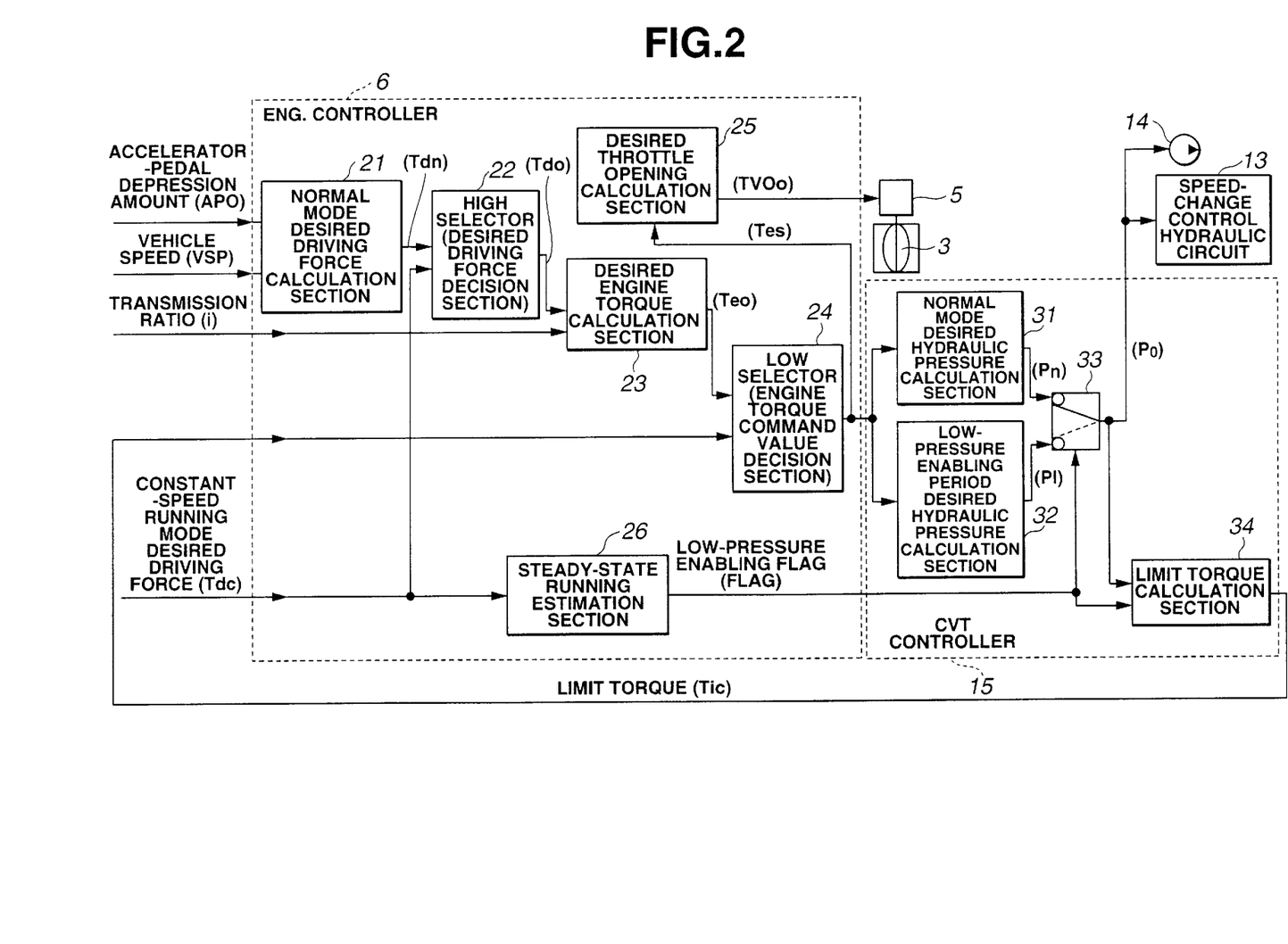
FIG. 2 is a block diagram showing the detailed structure of an electronic CVT controller that performs a speed-change hydraulic pressure control and the detailed structure of an electronic engine controller that performs an engine control, both controllers included in the integrated control system of the first embodiment of FIG. 1.

Referring now to FIG. 2, there is shown the detailed structure of engine controller 6 and CVT controller 15 both incorporated in the apparatus of the first embodiment. Engine controller 6 executes the engine control routine shown in FIG. 3 to calculate or compute desired throttle opening $TVO_0$, whereas CVT controller 15 executes the speed-change hydraulic pressure control routine shown in FIG. 4 to calculate or compute desired speed-change hydraulic pressure $P_0$.

Figure 3:
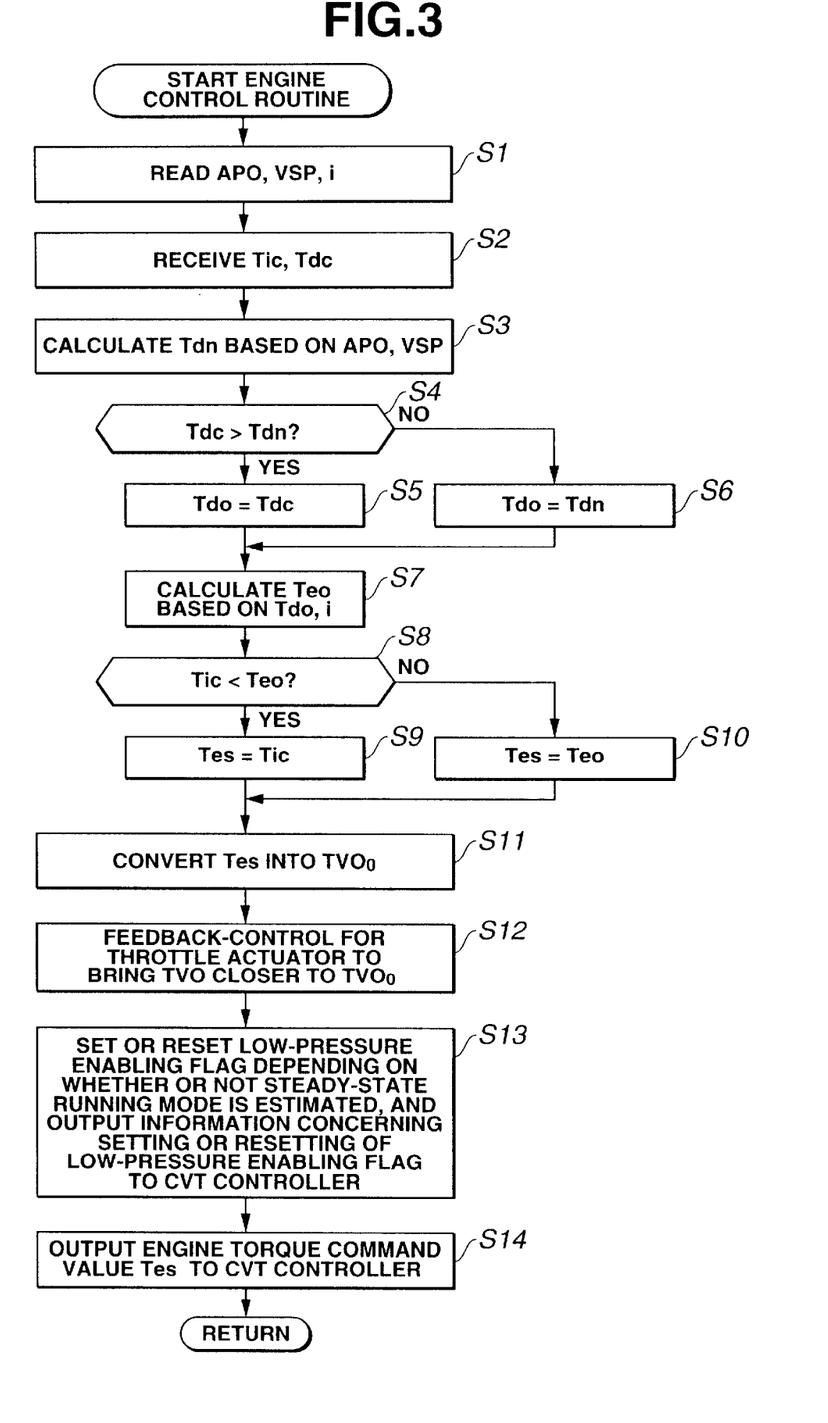
FIG. 3 is a flow chart illustrating an engine control program executed by the engine controller shown in FIG. 2.

A plurality of arithmetic and logical sections, constructing engine controller 6, are hereunder described in detail in reference to both the block diagram of FIG. 2 and the flow chart of FIG. 3. As shown in FIG. 2, engine controller 6 is comprised of a normal mode desired driving force arithmetic calculation section (or a non-constant speed running mode desired driving force arithmetic calculation section) 21, a desired driving force decision section 22, a desired engine torque arithmetic calculation section 23, an engine torque command value decision section 24, a desired throttle opening arithmetic calculation section 25, and a steady-state running estimation section 26. With the previously-noted arrangement, engine controller 6 executes the engine control routine of FIG. 3. This routine or arithmetic processing shown in FIG. 3 is executed as time-triggered interrupt routines to be triggered every predetermined sampling intervals.

At step S1, accelerator-pedal depression amount APO, vehicle speed VSP, and transmission ratio i are read.

At step S2, the input interface of engine controller 6 receives both the informational data (i.e., limit torque Tic) from CVT controller 15 and the informational data (i.e., constant-speed running mode desired driving force Tdc) from cruise controller 16.

At step S3, in order to derive a normal mode desired driving force (a non-constant speed running mode driving force) Tdn that is required by the driver under current engine/vehicle operating conditions, normal mode desired driving force calculation section 21 calculates or retrieves normal mode desired driving force Tdn based on accelerator-pedal depression amount APO (regarded as engine load) and vehicle speed VSP (regarded as engine speed) from a preprogrammed three-dimensional APO-VSP-Tdn characteristic map showing how normal mode desired driving force Tdn has to be varied relative to both accelerator-pedal depression amount APO and vehicle speed VSP.

As can be seen from steps S4–S6, within desired driving force decision section 22, normal mode desired driving force Tdn is compared to constant-speed running mode desired driving force Tdc, and then a higher one is selected by way of a select-HIGH processing Tdo=MAX(Tdn, Tdc). Concretely, when Tdc>Tdn, constant-speed running mode desired driving force Tdc is selected as a desired driving force Tdo (see Tdo=Tdc of step S5). Conversely when Tdc≦Tdn, normal mode desired driving force Tdn is selected as desired driving force Tdo (see Tdo=Tdn of step S6). That is, desired driving force decision section 22 serves as a high selector that selects a higher one of normal mode desired driving force Tdn and constant-speed running mode desired driving force Tdc.

At step S7, in order to achieve desired driving force Tdo obtained through steps S4–S6, desired engine torque calculation section 23 calculates a desired engine torque Teo based on both desired driving force Tdo and transmission ratio i calculated by transmission ratio arithmetic-calculation section 17.

As can be seen from steps S8–S10, within engine torque command value decision section 24, limit torque Tic for belt-drive CVT 2 is compared to desired engine torque Teo obtained through step S7, and then a lower one is selected by way of a select-LOW processing Tes=MIN(Teo, Tic). Concretely, when Tic<Teo, limit torque Tic is selected as an engine torque command value Tes (see Tes=Tic of step S9). Conversely when Tic≧Teo, desired engine torque Teo is selected as engine torque command value Tes (see Tes=Teo of step S10). That is, engine torque command value decision section 24 serves as a low selector that selects a lower one of limit torque Tic and desired engine torque Teo. Herein, limit torque Tic means an upper limit of input torque that there is no slippage between the variable-width pulley and the drive belt of belt-drive CVT 2 under the selected speed-change hydraulic pressure.

At step S11, desired throttle opening calculation section 25 retrieves a desired throttle opening $TVO_0$ from a preprogrammed engine-torque-command-value Tes to desired-throttle-opening $TVO_0$ conversion map.

At step S12, throttle actuator 5 is feedback-controlled in response to a control signal from engine controller 6, so that the actual throttle opening (throttle opening TVO) is brought closer to desired throttle opening $TVO_0$.

At step S13, steady-state running estimation section 26 estimates or determines based on a signal from cruise controller 16, corresponding to constant-speed running mode desired driving force Tdc, whether or not the system is held in an auto cruise control mode. During auto cruise control, steady-state running estimation section 26 of engine controller 6 determines that the vehicle is in the steady-state running mode (in the constant-speed running mode) in which a frequency of quick accelerating operations is low. When steady-state running estimation section 26 determines that the vehicle is in the steady-state running mode during the auto cruise control, steady-state running estimation section 26 sets low-pressure enabling flag FLAG to "1", and thereafter outputs information concerning FLAG=1 to CVT controller 15. Conversely, when steady-state running estimation section 26 determines that the vehicle is out of the steady-state running mode, that is, when the vehicle is in the normal driving mode, steady-state running estimation section 26 resets low-pressure enabling flag FLAG to "0", and thereafter outputs information concerning FLAG=0 to CVT controller 15. In the slippage prevention apparatus of the first embodiment, steady-state running estimation section 26 of engine controller 6 functions or serves as a quick-acceleration-frequency decision means that determines whether the frequency of quick accelerating operations is low or high. In the first embodiment, in order to estimate the steady-state running mode, the signal from cruise controller 16, that is, constant-speed running mode desired driving force Tdc is used. For example, when the auto cruise control system is in an operative state, the signal Tdc from cruise controller 16 may be provided as a high voltage signal above a reference level and variably controlled to maintain a preselected road speed. Conversely when the auto cruise control system is in an inoperative state, the signal Tdc from cruise controller 16 may be provided as a low voltage signal less than the reference level. In lieu thereof, a cruise control flag, indicative of engagement (an enabled state) for the auto cruise control and output from cruise controller 16 to engine controller 6, may be used. In this case, when the cruise control flag is set (=1), the engine controller determines that the vehicle is running in the steady-state running mode, and thus sets low-pressure enabling flag FLAG. Alternatively, an ON signal from a set switch of an auto cruise control system, functioning as a man-machine interface and to initiate or engage the auto cruise control, may be used to determine whether the vehicle is in the steady-state running mode. As may be appreciated, in the presence of the output of the ON signal from the set switch, the engine controller determines that the vehicle is in the steady-state running mode, and thus sets low-pressure enabling flag FLAG.

At step S14, engine torque command value Tes, determined or produced by engine torque command value decision section 24 of FIG. 2, is output to CVT controller 15. In the shown embodiment, engine torque command value Tes, generated from engine torque command value decision section 24, is used as an engine torque signal required for necessary arithmetic calculations performed within CVT controller 15. Instead of using engine torque command value Tes, an engine-torque estimate that can be estimated based on a quantity of intake air entering the engine cylinder and/or an engine speed may be used as the engine torque signal required for necessary arithmetic calculations performed within CVT controller 15.

Figure 4:
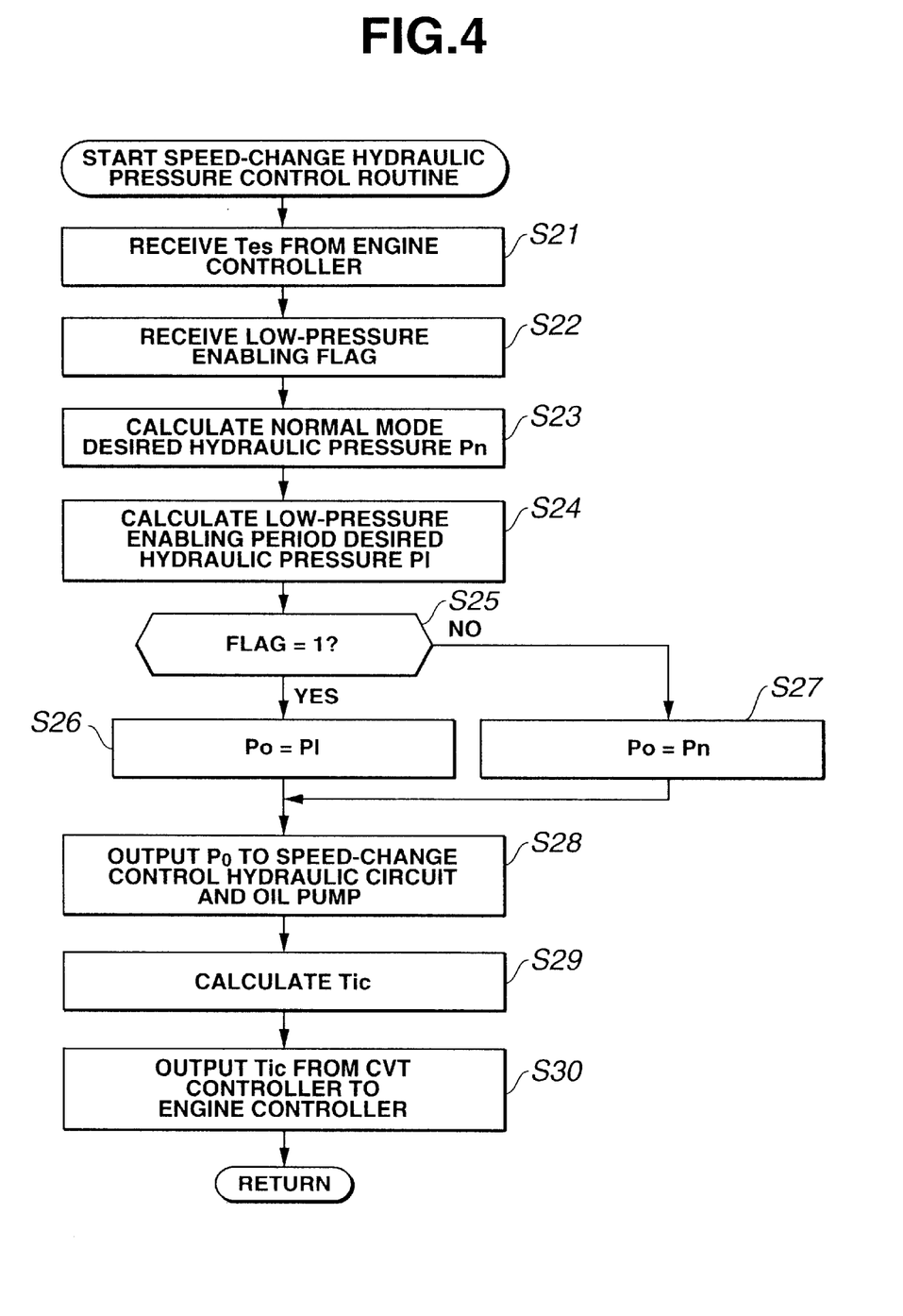
FIG. 4 is a flow chart illustrating a speed-change hydraulic pressure control program executed by the CVT controller shown in FIG. 2.

A plurality of arithmetic and logical sections, constructing CVT controller 15, are hereunder described in detail in reference to both the block diagram of FIG. 2 and the flow chart of FIG. 4. As shown in FIG. 2, CVT controller 15 is comprised of a normal mode desired hydraulic pressure arithmetic calculation section 31, a low-pressure enabling period desired hydraulic pressure arithmetic calculation section 32, a desired hydraulic pressure decision section 33, and a limit torque arithmetic calculation section 34. With the previously-noted arrangement, CVT controller 15 executes the speed-change hydraulic pressure control routine of FIG. 4.

At step S21, the input interface of CVT controller 15 receives engine torque command value Tes from engine controller 6.

At step S22, the input interface of CVT controller 15 also receives low-pressure enabling flag FLAG from engine controller 6.

At step S23, normal mode desired hydraulic pressure calculation section 31 calculates a normal mode desired hydraulic pressure Pn corresponding to a speed-change hydraulic pressure that there is no slippage between the variable-width pulley and the drive belt of the belt-drive CVT 2 under engine torque command value Tes (regarded as the current engine torque) even when quickly accelerating.

At step S24, low-pressure enabling period desired hydraulic pressure calculation section 32 calculates a low-pressure enabling period desired hydraulic pressure Pl corresponding to a speed-change hydraulic pressure that there is no slippage between the variable-width pulley and the drive belt of the belt-drive CVT 2 under engine torque command value Tes (regarded as the current engine torque) in absence of quick acceleration. As a matter of course, low-pressure enabling period desired hydraulic pressure Pl is lower than normal mode desired hydraulic pressure Pn.

As can be seen from steps S25–S28, within desired hydraulic pressure decision section 33, a check is made to determine whether low-pressure enabling flag FLAG is set (=1) or reset (=0). When the answer to step S25 is affirmative (YES), that is, when FLAG=1, the vehicle is in the steady-state running mode during which a frequency of quick accelerating operations is low and thus there is a reduced tendency for slippage between the variable-width pulley and the drive belt of the belt-drive CVT 2 to occur, even when the speed-change hydraulic pressure is adjusted to below normal mode desired hydraulic pressure Pn. When FLAG=1, low-pressure enabling period desired hydraulic pressure Pl is selected as desired speed-change hydraulic pressure $P_0$. Conversely when the answer to step S25 is negative (NO), that is, when FLAG=0, the vehicle is out of the steady-state running mode during which the frequency of quick accelerating operations is high, and thus there is an increased tendency for slippage between the variable-width pulley and the drive belt of the belt-drive CVT 2 to occur. Therefore, when FLAG=0, normal mode desired hydraulic pressure Pn is selected as desired speed-change hydraulic pressure $P_0$. At step S28, desired speed-change hydraulic pressure $P_0$, selected or determined through steps S25–27, is output to both speed-change control hydraulic circuit 13 and oil pump 14, for speed-change hydraulic pressure control.

As can be seen from steps S29 and S30, as the limit torque Tic, limit torque calculation section 34 determines an upper limit of input torque (contained within a predetermined input torque range) that there is no slippage between the variable-width pulley and the drive belt of belt-drive CVT 2 under desired speed-change hydraulic pressure $P_0$ set to low-pressure enabling period desired hydraulic pressure Pl, when low-pressure enabling flag FLAG is set (=1). As the limit torque Tic, limit torque calculation section 34 determines an upper limit of input torque that there is no slippage between the variable-width pulley and the drive belt of the belt-drive CVT 2 under desired speed-change hydraulic pressure $P_0$ set to normal mode desired hydraulic pressure Pn, when low-pressure enabling flag FLAG is reset (=0). At step S30, limit torque Tic is output from CVT controller 15 to engine controller 6 for the purpose of determining engine torque command value Tes within engine torque controller 15.

As will be appreciated from the above, according to the slippage prevention apparatus of the first embodiment, when steady-state running estimation section 26 determines that the vehicle is in the steady-state running mode (in the constant-speed running mode) that the frequency of quick accelerating operations is low, low-pressure enabling period desired hydraulic pressure Pl is selected as desired speed-change hydraulic pressure $P_0$ by way of setting (FLAG=1) of low-pressure enabling flag FLAG. In comparison with the normal driving mode (the non-constant speed running mode) that the frequency of quick accelerating operations is high, during the steady-state running mode with the low quick-acceleration frequency the speed-change hydraulic pressure (desired speed-change hydraulic pressure $P_0$) of belt-drive CVT 2 can be set at a relatively low pressure level. Therefore, only during the normal driving mode (the non-constant speed running mode) that the frequency of quick accelerating operations is high and thus slippage of belt-drive CVT 2 becomes an issue, the speed-change hydraulic pressure can be set or controlled to the relatively high normal mode desired hydraulic pressure Pn, calculated by normal mode desired hydraulic pressure calculation section 31 (see step S23 of FIG. 4). This contributes to prevention of undesired slippage between the variable-width pulley and the drive belt. On the contrary, during the auto cruise control mode, constant-speed running mode or steady-state running mode that the frequency of quick accelerating operations is low and thus there is less possibility of slippage, the speed-change hydraulic pressure can be set or controlled to the relatively low low-pressure enabling period desired hydraulic pressure Pl calculated by low-pressure enabling period desired hydraulic pressure calculation section 32 (see step S24 of FIG. 4). This prevents a wasteful rise in the speed-change hydraulic pressure, that is, the wasteful increase in the load on oil pump 14, and enables the optimum speed-change control, thus improving the fuel economy and vehicle driveability. Additionally, according to the slippage prevention apparatus of the first embodiment, in determining engine torque command value Tes by selecting the smaller one of desired engine torque Teo suited to the normal driving mode (the non-constant speed running mode) and limit torque Tic (the upper limit of input torque of CVT 2) by way of the select-LOW processing Tes=MIN(Teo, Tic) via engine torque command value decision section 24 when engine controller 6 determines that the frequency of quick accelerating operations is low and therefore the speed-change hydraulic pressure is set to a relatively low pressure level, engine controller 6 selects limit torque Tic as engine torque command value Tes. This is because the limit torque Tic is a low pressure level corresponding to low-pressure enabling period desired hydraulic pressure Pl (<Pn) during the operating mode with the low frequency of quick accelerating operations. Thus, even in presence of depression of accelerator pedal 4 during the operating mode with the low frequency of quick accelerating operations, the upper limit of engine torque output can be limited or suppressed to the limit torque value Tic, thus effectively preventing a rise in the engine torque output above the limit torque value Tic. As a consequence, it is possible to a void a rise in engine torque from starting to develop before a rise in speed-change hydraulic pressure whose change can be generally performed with a relatively great response delay in comparison with the change in engine torque. This prevents undesired slippage of belt-drive CVT 2, even in presence of depression of accelerator pedal 4 during the operating mode with the low frequency of quick accelerating operations.

In the slippage prevention apparatus of the first embodiment, in order to suppress or limit the engine torque output (engine power output) when engine controller 6 determines that the frequency of quick accelerating operations is low, that is, during the auto cruise control (during steady-state running mode or during the constant-speed running mode), the engine torque output (i.e., engine torque command value Tes) is set or controlled to an engine torque value corresponding to limit torque Tic being equivalent to an upper limit of input torque that is there is no slippage between the variable-width pulley and the drive belt of belt-drive CVT 2 under the effectively reduced speed-change hydraulic pressure (that is, under desired speed-change hydraulic pressure $P_0$ set to low-pressure enabling period desired hydraulic pressure Pl). In this manner, for suppression or limitation of the engine torque output during the low frequency of quick accelerating operations, the magnitude of the engine torque output value (substantially corresponding to the magnitude of engine torque command value Tes, in other words, the magnitude of input torque of belt-drive CVT 2) is limited or suppressed. To provide the same effect (effective suppression or limitation of the engine output torque during the low frequency of quick accelerating operations), instead of limiting or suppressing the magnitude of engine torque command value Tes, a time rate of change (a time rate of rise) in engine torque command value Tes may be limited during a sudden driver's accelerator pedal depression. In other words, for suppression or limitation of the engine torque output during the low frequency of quick accelerating operations, the engine torque output may be suppressed or limited to an engine torque value corresponding to a limit torque value estimated by a predetermined possible CVT input-torque time rate of change (a preprogrammed possible CVT input-torque speed or a preprogrammed engine torque output response characteristic) based on a possible time rate of change in the speed-change hydraulic pressure (a possible speed-change hydraulic pressure increasing/decreasing rate of belt-drive CVT 2 or a speed-change hydraulic pressure response characteristic of belt-drive CVT 2).

In the slippage prevention apparatus of the first embodiment, steady-state running estimation section 26 determines or discriminates that the frequency of quick accelerating operations is low while the auto cruise control is engaged and thus the vehicle is in the constant-speed running mode (or in the steady-state running mode). On auto cruise control system equipped automotive vehicles, it is possible to easily use a signal indicative of an engaged state of the cruise control system, and whereby it is possible to inexpensively precisely determine whether the frequency of quick accelerating operations is low or high.

Figure 5:
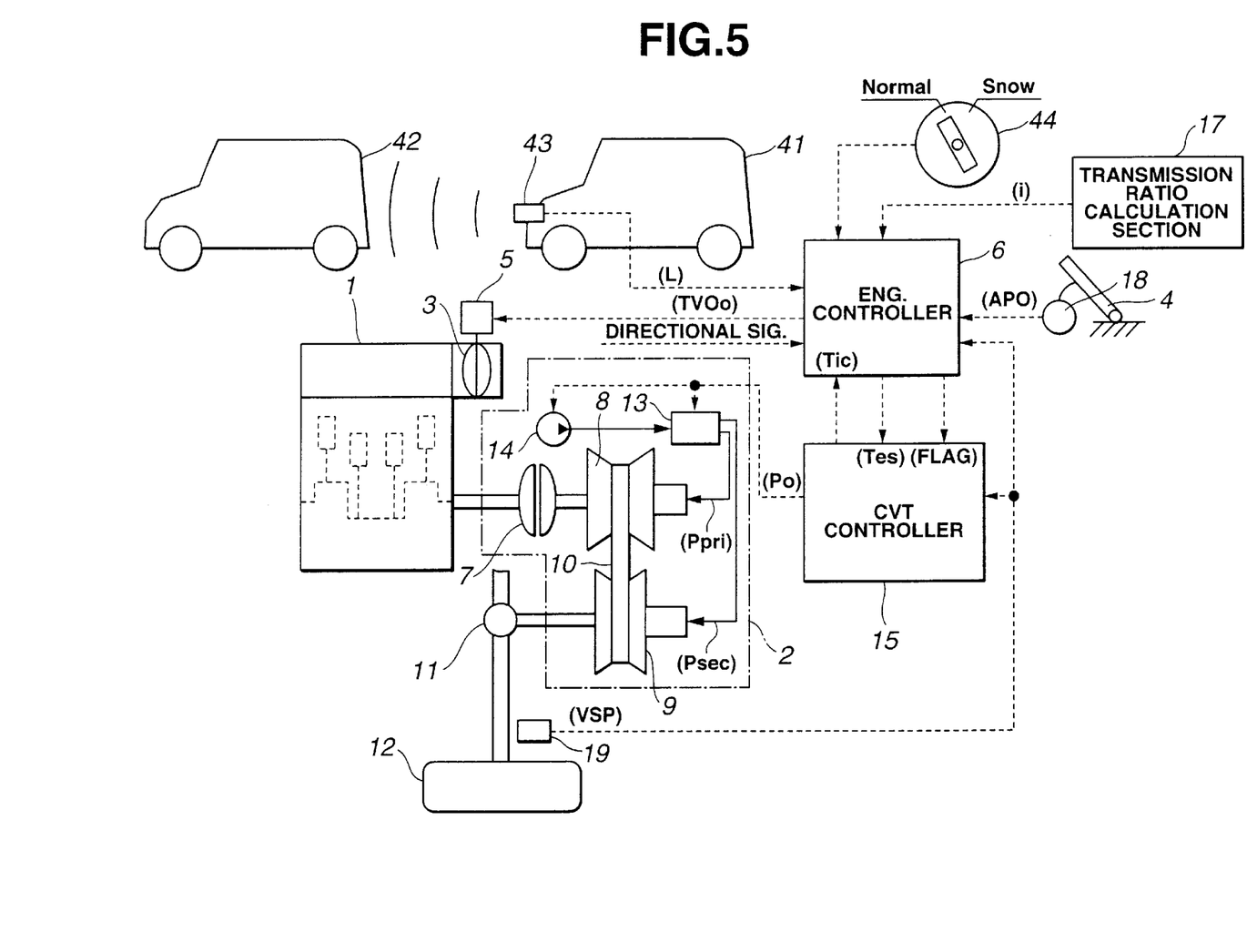
FIG. 5 is a system block diagram of a second embodiment illustrating a power train and an integrated control system of an automotive vehicle employing a slippage prevention apparatus of a belt-drive CVT.
Figure 6:
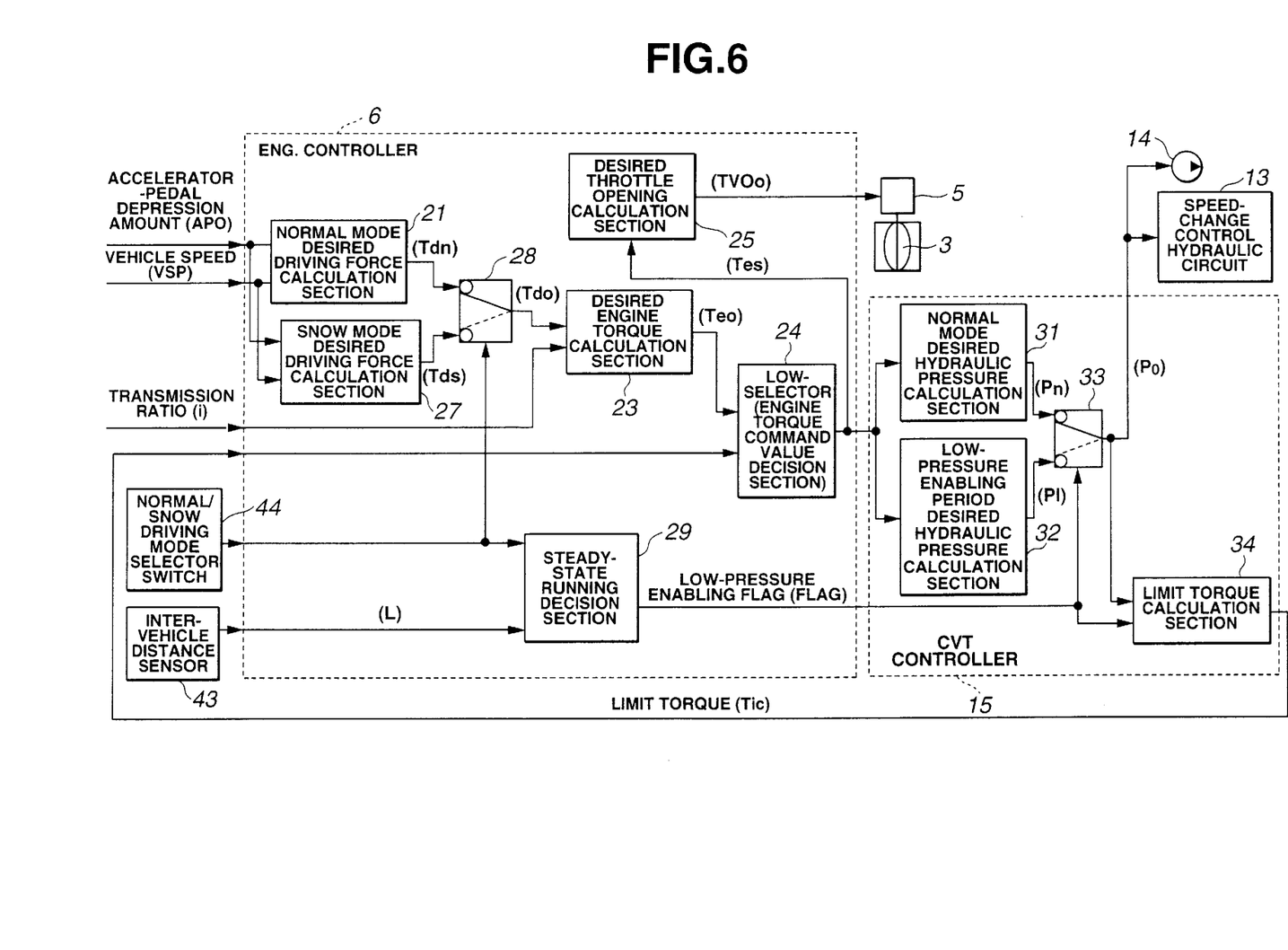
FIG. 6 is a block diagram showing the detailed structure of an electronic CVT controller that performs a speed-change hydraulic pressure control and the detailed structure of an electronic engine controller that performs an engine control, both controllers included in the integrated control system of the second embodiment of FIG. 5.
Figure 7:
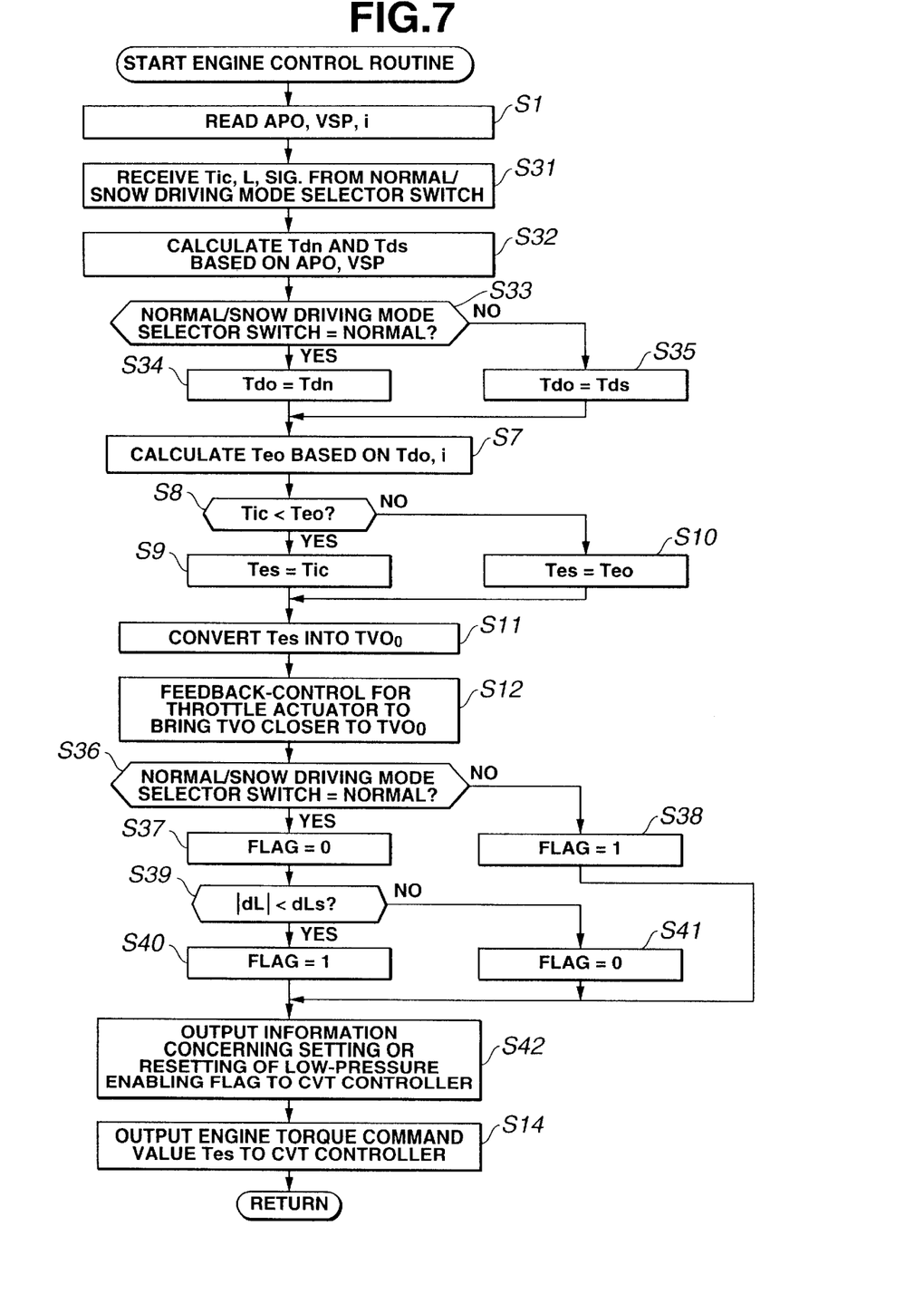
FIG. 7 is a flow chart illustrating an engine control program executed by the engine controller shown in FIG. 6.

Referring now to FIGS. 5, 6, and 7, there are shown the slippage prevention apparatus of belt-drive CVT 2 of the second embodiment. The slippage prevention apparatus of the second embodiment is advantageous with respect to application to inter-vehicle distance control system equipped automotive vehicles. The slippage prevention apparatus of the second embodiment shown in FIGS. 5–7 is different from that of the first embodiment shown in FIGS. 1–4, in that instead of using cruise controller 16, an inter-vehicle distance sensor 43 and a normal/snow driving mode selector switch 44 are provided. Inter-vehicle distance sensor 43 is provided to monitor or detect an inter-vehicle distance L between a host vehicle 41 and a preceding vehicle 42 (see FIG. 5). As is generally known, the inter-vehicle distance control system functions to maintain the host vehicle's distance L from the preceding vehicle 42 at a preset inter-vehicle distance. For instance, when inter-vehicle distance L detected by sensor 43 reduces to below the preset inter-vehicle distance, the system operates to increase the inter-vehicle distance from the preset inter-vehicle distance by braking action and thus to avoid a frontal collision. Mode selector switch 44 is switchable between a normal driving mode and a snow driving mode. The snow driving mode is suitable for use in winter-type driving conditions on snow or icy roads. In comparison with the normal driving mode, a control gain for a rate of change in engine torque output with respect to the amount of depression of accelerator pedal 4 is set to a relatively smaller gain suited to the snow driving mode. That is, during the snow driving mode, throttle actuator 5 is operated based on the relatively smaller control gain to avoid undesirable acceleration slip and realize better traction. Engine controller 6 receives input information from both inter-vehicle distance sensor 43 and normal/snow driving mode selector switch 44, in addition to various input informational data, namely accelerator-pedal depression amount APO, vehicle speed VSP, transmission ratio i, and limit torque Tic, so as to execute the engine control routine shown in FIG. 7 and consequently to compute desired throttle opening $TVO_0$ and to properly set or reset low-pressure enabling flag FLAG. In the slippage prevention apparatus of the second embodiment, steady-state running decision section 29 of engine controller 6 functions or serves as a quick-accelerating-operation decision means that determines whether the frequency of quick accelerating operations is low or high.

Referring now to FIG. 6, there is shown the detailed structure of engine controller 6 and CVT controller 15 both incorporated in the apparatus of the second embodiment. Arithmetic and logical operations executed by CVT controller 15 of the apparatus of the second embodiment are the same as the first embodiment. Thus, detailed description of calculation and decision sections 31, 32, 33, and 34 included in CVT controller 15 of the second embodiment will be omitted because the above description thereon seems to be self-explanatory. On the other hand, arithmetic and logical operations executed by engine controller 6 of the apparatus of the second embodiment (see FIGS. 6 and 7) are different from those executed by engine controller 6 of the first embodiment (see FIGS. 2 and 3). As shown in FIG. 6, engine controller 6 of the second embodiment is comprised of a snow-mode desired driving force arithmetic calculation section 27, a desired driving force selector switch 28 (used instead of high selector 22), and a steady-state running decision section 29 (used instead of steady-state running estimation section 26), in addition to normal mode desired driving force arithmetic calculation section (or non-constant speed running mode desired driving force arithmetic calculation section) 21, desired engine torque arithmetic calculation section 23, engine torque command value decision section 24, and desired throttle opening arithmetic calculation section 25. Snow-mode desired driving force arithmetic calculation section 27, desired driving force selector switch 28, and steady-state running decision section 29 will be hereinafter described in detail with reference to the accompanying drawings. Engine controller 6 of the apparatus of the second embodiment executes the engine control routine of FIG. 7, as follows.

At step S1, accelerator-pedal depression amount APO, vehicle speed VSP, and transmission ratio i are read. Thereafter, step S31 occurs.

At step S31, the input interface of engine controller 6 receives various informational data, that is, limit torque Tic from CVT controller 15, inter-vehicle distance L from inter-vehicle distance sensor 43, and a driving-mode indicative signal from normal/snow driving mode selector switch 44.

After this, at step S32, in order to derive normal mode desired driving force (non-constant speed running mode driving force) Tdn suited to the normal driving mode, normal mode desired driving force calculation section 21 calculates or retrieves normal mode desired driving force Tdn based on accelerator-pedal depression amount APO and vehicle speed VSP from the preprogrammed three-dimensional APO-VSP-Tdn characteristic map. At the same time, at step S32, in order to derive a snow-mode desired driving force Tds suited to the snow driving mode, snow-mode desired driving force arithmetic calculation section 27 calculates or retrieves snow-mode desired driving force Tds based on accelerator-pedal depression amount APO and vehicle speed VSP from a preprogrammed three-dimensional APO-VSP-Tds characteristic map.

As can be seen from steps S33–S35, desired driving force selector switch 28 selects either one of normal mode desired driving force Tdn and snow-mode desired driving force Tds depending on whether the driving mode selected by normal/snow driving mode selector switch 44 is the normal driving mode or the snow driving mode. Concretely, when the selected driving mode is the normal driving mode, that is, when the answer to step S33 is in the affirmative (YES), the routine proceeds to step S34 so as to select normal mode desired driving force Tdn as desired driving force Tdo (see Tdo=Tdn of step S34). In contrast, when the selected driving mode is the snow driving mode, that is, when the answer to step S33 is in the negative (NO), the routine proceeds to step S35 so as to select snow-mode desired driving force Tds as desired driving force Tdo (see Tdo=Tds of step S35). Thereafter, the routine proceeds to a series of steps S7–S12.

At step S7, in order to achieve desired driving force Tdo obtained through steps S33–S35, desired engine torque calculation section 23 calculates a desired engine torque Teo based on both desired driving force Tdo and transmission ratio i calculated by transmission ratio arithmetic-calculation section 17. Through steps S8–S10, engine torque command value decision section 24 (low selector) selects a lower one of limit torque Tic and desired engine torque Teo, as engine torque command value Tes. At step S11, desired throttle opening calculation section 25 calculates or map-retrieves desired throttle opening $TVO_0$ from preprogrammed Tes-to-$TVO_0$ conversion map. Then, at step S12, throttle actuator 5 is feedback-controlled in response to a control signal from engine controller 6, so that the actual throttle opening (throttle opening $TV_O$) is brought closer to desired throttle opening $TVO_O$.

Steady-state running decision section 29 performs a series of steps S36–S42 of FIG. 7, so as to determine whether or not host vehicle 41 is in the steady-state running mode, and to set or reset low-pressure enabling flag FLAG depending on whether the vehicle driving mode is the normal driving mode or the snow driving mode. That is, in the slippage prevention apparatus of the second embodiment, steady-state running decision section 29 of engine controller 6 functions or serves as a quick-acceleration-frequency decision means that determines whether the frequency of quick accelerating operations is low or high.

Actually, at step S36, steady-state running decision section 29 of the engine controller discriminates or determines based on the signal from normal/snow driving mode selector switch 44, whether the current vehicle driving mode is the normal driving mode or the snow driving mode. When the answer to step S36 is in the negative (NO), that is, when the snow driving mode is selected, the engine controller determines that the vehicle is in the steady-state running mode in which the frequency of quick accelerating operations is low. The routine proceeds from step S36 to step S38. At step S38, low-pressure enabling flag FLAG is set to "1", and thereafter at step S42 information concerning FLAG=1 is output to CVT controller 15.

Conversely when the answer to step S36 is in the affirmative (YES), that is, when the normal driving mode is selected, the engine controller determines that the vehicle is out of the steady-state running mode in which the frequency of quick accelerating operations is high. The routine proceeds from step S36 to step S37. At step S37, low-pressure enabling flag FLAG is temporarily reset to "0". Thereafter at step S39, a check is made to determine whether an absolute value $|dL|$ of a time rate of change in inter-vehicle distance L is less than a preset or predetermined threshold value dLs. When the answer to step S39 is in the affirmative (YES), that is, when $|dL|<dLs$, steady-state running decision section 29 of the engine controller determines that there is less possibility for quick accelerating operations. The routine proceeds from step S39 to step S40. Low-pressure enabling flag FLAG, temporarily reset to "0" through step S37, is set again to "1" at step S40, and then information concerning FLAG=1 is output to CVT controller 15 via step S42.

In contrast, when the answer to step S39 is in the negative (NO), that is, when $|dL|\geq dLs$, for reasons that will appear hereafter, steady-state running decision section 29 of the engine controller determines that the vehicle is in a quick-acceleration operating mode for passing. In this case, the routine proceeds from step S39 to step S41, so as to reset low-pressure enabling flag FLAG to "0", and then information concerning FLAG=0 is output to CVT controller 15 via step S42.

The main reason why the inequality $|dL|\geq dLs$ means the quick-acceleration operating mode for passing, is that host vehicle 41 has to be, first of all, rapidly accelerated before lane-changing toward a passing lane when host vehicle 41 passes the preceding vehicle 42 ahead, and as a result host vehicle 41 tends to approach rapidly close to the rear end of the preceding vehicle 42 during passing. As a matter of course, in the event of rapid approach to the preceding vehicle (a first preceding vehicle), that is, when rapidly accelerating host vehicle 41 toward the passing lane, the time rate of change dL in inter-vehicle distance L becomes a negative value and additionally the absolute value $|dL|$ of the time rate of change in inter-vehicle distance L becomes greater than or equal to preset threshold value dLs. Just after the rapid accelerating operation has been completed and host vehicle 41 has moved toward the passing lane, the host vehicle's distance L from another vehicle (a second preceding vehicle) traveling ahead of the host vehicle tends to be greater than the inter-vehicle distance between host vehicle 41 and the first preceding vehicle. Just after such lane-changing, the time rate of change dL in inter-vehicle distance L becomes a positive value and additionally the absolute value $|dL|$ of the time rate of change in inter-vehicle distance L becomes greater than or equal to preset threshold value dLs. For the reasons discussed above, the inequality $|dL|\geq dLs$ can be regarded as the quick-acceleration operating mode for passing.

Returning to step S14 of FIG. 7, in the same manner as step S14 of FIG. 3, engine torque command value Tes, determined or produced by engine torque command value decision section 24 of FIG. 6 (see steps S8–S10 of FIG. 7), is output to CVT controller 15.

As will be appreciated from the above, according to the slippage prevention apparatus of the second embodiment, when steady-state running decision section 29 determines that the vehicle is in the snow driving mode that the frequency of quick accelerating operations is low (see the flow from step S36 to step S38 in FIG. 7) or determines that the condition $|dL|<dLs$ is satisfied even in the normal driving mode and thus there is less possibility for quick accelerating operations (see the flow from step S36 via steps S37 and S39 to step S40 in FIG. 7), low-pressure enabling period desired hydraulic pressure Pl is set to desired speed-change hydraulic pressure $P_O$ by way of setting (FLAG=1) of low-pressure enabling flag FLAG. In comparison with the operating mode during which the frequency of quick accelerating operations is high, such as during normal driving mode under the condition $|dL|\geq dLs$, during the operating mode during which the frequency of quick accelerating operations is low, such as during normal driving mode under the condition $|dL|<dLs$ or during the snow driving mode, the speed-change hydraulic pressure (desired speed-change hydraulic pressure $P_O$) of belt-drive CVT 2 can be set at a relatively low pressure level. Therefore, only when the vehicle is quickly accelerating during the normal driving mode and thus slippage of belt-drive CVT 2 becomes an issue, the speed-change hydraulic pressure can be set or controlled to the relatively high normal mode desired hydraulic pressure Pn, calculated by normal mode desired hydraulic pressure calculation section 31 (see step S23 of FIG. 4). This contributes to prevention of undesired slippage between the variable-width pulley and the drive belt. On the contrary, during normal driving mode under the condition $|dL|<dLs$ or during the snow driving mode, during which the frequency of quick accelerating operations is low and thus there is less possibility of slippage, the speed-change hydraulic pressure can be set or controlled to the relatively low low-pressure enabling period desired hydraulic pressure Pl calculated by low-pressure enabling period desired hydraulic pressure calculation section 32 (see step S24 of FIG. 4). This prevents a wasteful rise in the speed-change hydraulic pressure, that is, the wasteful increase in the load on oil pump 14, and enables the optimum speed-change control, thus improving the fuel economy and vehicle driveability. Additionally, the slippage prevention device of the second embodiment of FIGS. 5–7 provides the following same operation and effect as that of the first embodiment of FIGS. 1–4. For a time period during which engine controller 6 determines that the frequency of quick accelerating operations is low and therefore the speed-change hydraulic pressure is set to a relatively low pressure level, limit torque Tic is selected as engine torque command value Tes. Thus, even in presence of depression of accelerator pedal 4 during the operating mode with the low frequency of quick accelerating operations, the upper limit of engine torque can be limited or suppressed to the limit torque value Tic. As a consequence, it is possible to avoid a rise in engine torque from starting to develop before a rise in speed-change hydraulic pressure whose change can be generally performed with a relatively great response delay in comparison with the change in engine torque. This avoids undesired slippage of belt-drive CVT 2, even in presence of depression of accelerator pedal 4 during the operating mode with the low frequency of quick accelerating operations.

In the device of the second embodiment, in order to determine whether the selected operating mode is the normal driving mode or the snow driving mode, the angular position of normal/snow driving mode selector switch 44 may be used. For example, when the angular position of selector switch 44 has been moved to the snow driving mode, engine controller 6 determines that the snow driving mode is selected, and thus sets low-pressure enabling flag FLAG indicating that the frequency of quick accelerating operations is low (see the flow from step S36 to step S38 in FIG. 7). On automotive vehicles that a control gain for a rate of change in engine torque output with respect to an accelerator-pedal depression amount is switchable between a snow driving mode (a relatively small gain) and a normal driving mode (a relatively large gain) directly by means of normal/snow driving mode selector switch 44 (serving as again selector), the signal from normal/snow driving mode selector switch 44 may be used to determine whether the selected operating mode is the normal driving mode or the snow driving mode. In such a case, it is possible to inexpensively precisely determine whether the frequency of quick accelerating operations is low or high.

As can be appreciated from the flow chart of FIG. 7, in the slippage prevention device of the second embodiment, there are two flows for setting low-pressure enabling flag FLAG to "1", namely the flow from step S36 to step S38, and the flow from step S36 via steps S37 and S39 to step S40. That is, steady-state running decision section 29 of engine controller 6 never unconditionally determines or discriminates that the frequency of quick accelerating operations is high, by only the condition that the normal driving mode is selected. Steady-state running decision section 29 further takes into account the condition of $|dL|<dLs$ (or $|dL|\geq dLs$). According to the device of the second embodiment, low-pressure enabling flag FLAG can be set, when the inequality $|dL|<dLs$ is satisfied even during the normal driving mode (see the flow S39→S40 in FIG. 7). Therefore, the device of the second embodiment enables the speed-change hydraulic pressure to timely properly build up only when the speed-change hydraulic pressure has to be actually controlled to a high pressure level, such as when accelerating the vehicle for passing. This ensures more optimal speed-change hydraulic pressure control.

In the shown embodiments, in order to detect, estimate or determine the frequency of quick accelerating operations, the engaged state of auto cruise control, the signal from normal/snow driving mode selector switch 44 representative of the snow driving mode, the absolute value $|dL|$ of the rate of change in inter-vehicle distance less than preset threshold value dLs are used. Instead of using the inter-vehicle-distance rate-of-change dL (exactly, the absolute value $|dL|$ of the rate of change in inter-vehicle distance), the inter-vehicle distance L itself may be used to determine whether the frequency of quick accelerating operations is low (i.e., the vehicle is in the steady-state running mode) or high (i.e., the vehicle is out of the steady-state running mode). In this case, the slippage prevention device may determine that the frequency of quick accelerating operations is low, when inter-vehicle distance L is less than a preset threshold value (a preset inter-vehicle distance) Ls (i.e., L<Ls). Conversely when inter-vehicle distance L is greater than or equal to the preset inter-vehicle distance Ls (i.e., $L\geq Ls$), the slippage prevention device may determine that the frequency of quick accelerating operations is high. To more precisely timely estimate or determine the frequency of quick accelerating operations, both of the aforementioned absolute value $|dL|$ of the rate of change in inter-vehicle distance and inter-vehicle distance L may be used. In this case, it is possible to precisely timely reset low-pressure enabling flag FLAG (FLAG=0 means that the frequency of quick accelerating operations is high) if the condition of $|dL|\geq dLs$ is satisfied even when the condition of L<Ls is satisfied and low-pressure enabling flag FLAG is temporarily set. This enhances the vehicle driveability, in particular, the acceleration performance during passing.

In determining that the frequency of quick accelerating operations is low, based on inter-vehicle distance L (that is, when L<Ls), a directional signal (see FIG. 5) from a turn signal indicator switch of host vehicle 41 may be further taken into account. For example, in presence of an output of the directional signal from the turn signal indicator switch even when inter-vehicle distance L is less than its preset threshold value Ls, the engine controller may determine that the frequency of quick accelerating operations is high. In this case, the engine controller can precisely timely reset low-pressure enabling flag FLAG if the output of the directional signal is present even when the condition of L<Ls is satisfied and low-pressure enabling flag FLAG is temporarily set. This enhances the vehicle driveability during left or right turns.

The entire contents of Japanese Patent Application No. P2002-012642 (filed Jan. 22, 2002) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A slippage prevention apparatus of a belt-drive continuously variable transmission for an automotive vehicle whose transmission ratio is controlled by a speed-change hydraulic pressure brought closer to a desired speed-change hydraulic pressure, comprising:

a quick-acceleration-frequency decision section that determines whether a frequency of quick accelerating operations is low or high; and a desired hydraulic pressure decision section that sets the desired speed-change hydraulic pressure used during an operating mode that the frequency of quick accelerating operations is low to a relatively lower pressure level than the desired speed-change hydraulic pressure used during an operating mode that the frequency of quick accelerating operations is high.

2. The slippage prevention apparatus as claimed in claim 1, wherein:

the quick-acceleration-frequency decision section determines that the frequency of quick accelerating operations is low, when the vehicle is held in a constant-speed running mode during auto cruise control.

3. The slippage prevention apparatus as claimed in claim 1, further comprising:
a gain selector that selects either of a first gain for a rate of change in engine torque output with respect to an accelerator-pedal depression amount and a second gain relatively lower than the first gain, depending on operating conditions of the vehicle; and
wherein the quick-acceleration-frequency decision section determines that the frequency of quick accelerating operations is low, when the second gain is selected.

4. The slippage prevention apparatus as claimed in claim 1, further comprising:
an inter-vehicle distance sensor that detects an inter-vehicle distance between a host vehicle and a preceding vehicle; and
wherein the quick-acceleration-frequency decision section determines, depending on the inter-vehicle distance, whether the frequency of quick accelerating operations is low or high.

5. The slippage prevention apparatus as claimed in claim 4, wherein:
the quick-acceleration-frequency decision section determines that the frequency of quick accelerating operations is low, when the inter-vehicle distance is less than a preset inter-vehicle distance.

6. The slippage prevention apparatus as claimed in claim 5, wherein:
the quick-acceleration-frequency decision section determines that the frequency of quick accelerating operations is high, if an absolute value of a time rate of change in the inter-vehicle distance is less than a preset threshold value even when the inter-vehicle distance is less than the preset inter-vehicle distance.

7. The slippage prevention apparatus as claimed in claim 5, further comprising:
a turn signal indicator switch from which a directional signal is output; and
wherein the quick-acceleration-frequency decision section determines that the frequency of quick accelerating operations is high, if the directional signal is output even when the inter-vehicle distance is less than the preset inter-vehicle distance.

8. The slippage prevention apparatus as claimed in claim 1, wherein:
a rise in an engine torque output is suppressed by limiting the engine torque output to a limit torque even in presence of depression of an accelerator pedal, while the desired speed-change hydraulic pressure is set to the relatively lower pressure level during the operating mode that the frequency of quick accelerating operations is low.

9. The slippage prevention apparatus as claimed in claim 8, wherein:
the belt-drive continuously variable transmission comprises a variable-width pulley and a drive belt; and
the limit torque is set to an upper limit of input torque of the belt-drive continuously variable transmission that there is no slippage between the variable-width pulley and the drive belt under the speed-change hydraulic pressure brought closer to the desired speed-change hydraulic pressure set to the relatively lower pressure level during the operating mode that the frequency of quick accelerating operations is low.

10. The slippage prevention apparatus as claimed in claim 8, wherein:
the limit torque is estimated by a predetermined possible CVT input-torque time rate of change based on a possible time rate of change in the speed-change hydraulic pressure.

11. A slippage prevention apparatus of a belt-drive continuously variable transmission for an automotive vehicle whose transmission ratio is controlled by a speed-change hydraulic pressure brought closer to a desired speed-change hydraulic pressure, comprising:
a quick-acceleration-frequency decision means for determining whether a frequency of quick accelerating operations is low or high; and
a desired hydraulic pressure decision means for setting the desired speed-change hydraulic pressure used during an operating mode that the frequency of quick accelerating operations is low to a relatively lower pressure level than the desired speed-change hydraulic pressure used during an operating mode that the frequency of quick accelerating operations is high.

12. A method of preventing slippage between a variable-width pulley and a drive belt of a belt-drive continuously variable transmission for an automotive vehicle whose transmission ratio is controlled by a speed-change hydraulic pressure brought closer to a desired speed-change hydraulic pressure, the method comprising:
determining whether a frequency of quick accelerating operations is low or high;
setting a low-pressure enabling flag during an operating mode that the frequency of quick accelerating operations is low;
resetting the low-pressure enabling flag during an operating mode that the frequency of quick accelerating operations is high; and
setting the desired speed-change hydraulic pressure used during the operating mode that the low-pressure enabling flag is set to a relatively lower pressure level than the desired speed-change hydraulic pressure used during the operating mode that the low-pressure enabling flag is reset.

13. The method as claimed in claim 12, further comprising:
determining whether auto cruise control is engaged or disengaged;
setting the low-pressure enabling flag when the auto cruise control is engaged; and
resetting the low-pressure enabling flag when the auto cruise control is disengaged.

14. The method as claimed in claim 12, further comprising:
mode-selecting either of a normal driving mode and a snow driving mode;
setting the low-pressure enabling flag when the snow driving mode is selected; and
resetting the low-pressure enabling flag when the normal driving mode is selected.

15. The method as claimed in claim 12, further comprising:
detecting an inter-vehicle distance between a host vehicle and a preceding vehicle; and
setting the low-pressure enabling flag when the inter-vehicle distance is less than a preset inter-vehicle distance; and resetting the low-pressure enabling flag when the inter-vehicle distance is greater than or equal to the preset inter-vehicle distance.

16. The method as claimed in claim 15, further comprising:

calculating an absolute value of a time rate of change in the inter-vehicle distance; and resetting the low-pressure enabling flag if the absolute value of the time rate of change in the inter-vehicle distance is less than the preset threshold value even when the inter-vehicle distance is less than the preset inter-vehicle distance and the low-pressure enabling flag is temporarily set.

17. The method as claimed in claim 15, further comprising:

resetting the low-pressure enabling flag if a directional signal is input even when the inter-vehicle distance is less than the preset inter-vehicle distance and the low-pressure enabling flag is temporarily set.

18. The method as claimed in claim 12, further comprising:

suppressing arise in an engine torque output by limiting the engine torque output to a limit torque even in presence of depression of an accelerator pedal, while the desired speed-change hydraulic pressure is set to the relatively lower pressure level during the operating mode that the low-pressure enabling flag is set.

19. The method as claimed in claim 18, wherein:

the limit torque is set to an upper limit of input torque of the belt-drive continuously variable transmission that there is no slippage between the variable-width pulley and the drive belt under the speed-change hydraulic pressure brought closer to the desired speed-change hydraulic pressure set to the relatively lower pressure level during the operating mode that the low-pressure enabling flag is set.

20. The method as claimed in claim 18, wherein:

the limit torque is estimated by a predetermined possible CVT input-torque time rate of change based on a possible time rate of change in the speed-change hydraulic pressure.

* * * * *